United States Patent

Tesanovic et al.

(10) Patent No.: US 9,036,727 B2
(45) Date of Patent: May 19, 2015

(54) METHOD OF GENERATING A CODEBOOK

(75) Inventors: Milos Tesanovic, Harrow (GB); Timothy James Moulsley, Caterham (GB); Choo Chiap Chiau, Hertfordshire (GB)

(73) Assignee: Koninklijke Philips N.V., Eindhoven (NL)

( * ) Notice: Subject to any disclaimer, the term of this patent is extended or adjusted under 35 U.S.C. 154(b) by 167 days.

(21) Appl. No.: 13/577,265

(22) PCT Filed: Feb. 11, 2011

(86) PCT No.: PCT/IB2011/050582
§ 371 (c)(1),
(2), (4) Date: Aug. 6, 2012

(87) PCT Pub. No.: WO2011/098975
PCT Pub. Date: Aug. 18, 2011

(65) Prior Publication Data
US 2012/0314792 A1 Dec. 13, 2012

(30) Foreign Application Priority Data

Feb. 15, 2010 (EP) ..................................... 10305148
Mar. 30, 2010 (EP) ..................................... 10305326

(51) Int. Cl.
H04B 7/02 (2006.01)
H04B 7/06 (2006.01)
H04B 7/04 (2006.01)
(52) U.S. Cl.
CPC ............ H04B 7/0639 (2013.01); H04B 7/0456 (2013.01); *H04B 7/0478* (2013.01); *H04B 7/0469* (2013.01)

(58) Field of Classification Search
CPC .. H04B 7/0639; H04B 7/0417; H04B 7/0634; H04B 7/0452; H04B 7/0478; H04B 7/0663; H04B 7/0456; H04B 7/0626; H04B 7/063; H04B 7/0469; H04B 7/0486; H04B 7/0669; H04B 7/0619; H04B 7/0621; H04B 7/0636; H04L 1/0029; H04L 1/0026; H04L 2025/03426; H04L 25/03942; H04L 25/03898; H04L 5/0053; H01Q 3/2605
USPC .......... 375/267, 260, 295, 299, 259; 370/252, 370/203; 342/377, 368, 350; 455/562.1, 455/226.1, 561, 130, 550.1, 73
See application file for complete search history.

(56) References Cited

U.S. PATENT DOCUMENTS

2009/0238298 A1  9/2009  Kim et al.
2012/0002750 A1*  1/2012  Hooli et al. ................... 375/295
2013/0100996 A1*  4/2013  Clerckx et al. ................ 375/219

OTHER PUBLICATIONS

Spencer, Q.H.; Peel, C.B.; Swindlehurst, A.L.; Haardt, M., "An introduction to the multi-user MIMO downlink," Communications Magazine, IEEE , vol. 42, No. 10, pp. 60,67, Oct. 2004.*
Catt: "Codebook Design for 8Tx DL MIMO", 3GPP Draft; R1-100022, 3rd Generation Partnership Project, Mobile Competence Center, vol. RAN WG1, Jan. 12, 2010.*

(Continued)

*Primary Examiner* — Chieh M Fan
*Assistant Examiner* — Michelle M Koeth

(57) ABSTRACT

A precoding codebook matrix/vector of length 2L is generated by the selection of two matrices/vectors, each from one of a predetermined set of LxL matrices and multiplying each column of one of the matrices/vectors by a complex coefficient.

12 Claims, 2 Drawing Sheets

(56) References Cited

OTHER PUBLICATIONS

Spencer, Q.H.; Peel, C.B.; Swindlehurst, A.L.; Haardt, M., "An introduction to the multi-user MIMO downlink," Communications Magazine, IEEE, vol. 42, No. 10, pp. 60,67, Oct. 2004.*

Catt: "Codebook Design for 8Tx DL MIMO", 3GPP Draft; R1-100022, 3rd Generation Partnership Project, Mobile Competence Center, vol. RAN WG1, Jan. 12, 2010, 8 Pages.

Motorola: "Codebook for 8Tx DL SU-MIMO for LTE-A", 3GPP Draft; R1-100203, 3rd Generation Partnership Project, Mobile Competence Centre, vol. RAN WG1, Jan. 12, 2010, 4 Pages.

ZTE: DL Codebook Design for 8 Tx MIMO in LTE-A, 3GPP Draft, R1-100531, 3rd Generation Partnership Project, Mobile Competence Centre, vol. RAN WG1, Jan, 12, 2010, 7 Pages.

Huawei: "Extensions to REL-8 Type CQI/PMI/RI Feedback Using Double Codebook Structure", R1-100251, 3GPP TSG RAN WG1 #59BIS, Valeancia, Spain, Jan. 18-22, 2010, 4 Pages.

Marvell, "Precoding Codebooks for 8TX", R1-100083, 3GPP TSG-RAN WG1 #59BIS, Valencia, Spain, Jan. 18-22, 2010, 10 Pages.

Ericsson, ST-Ericsson: "A Flexible Feedback Concept", 3GPP TSG-RAN WG1 #59BIS, Valencia, Spain, Jan. 18-22, 2010, 5 Pages.

* cited by examiner

METHOD OF GENERATING A CODEBOOK

FIELD OF THE INVENTION

The invention relates to a communication system and a communication method where stations are using MIMO transmissions. In a particular example, the invention relates to mobile network, like UMTS Long Term Evolution (LTE) network.

BACKGROUND OF THE INVENTION

In a wireless communication such as LTE, both the base station (also called the evolved Node B or eNodeB) and terminal (also called User Equipment or UE) are typically equipped with multiple antennas. This allows MIMO operation. The mobile terminals typically measure the downlink channels for each pair of antennas and derives a channel state report to send to the base station. The base station can then use this information for scheduling decisions such as:
  Which terminals to transmit to;
  Which frequency/time/code resources are used;
  MIMO transmission mode (e.g. number of spatial streams, SU-MIMO or MU-MIMO).

An effective method for capturing the channel state information is to select the entry from a codebook of precoders which, if applied at the transmitter, would lead to the highest data rate. The number of spatial streams assumed would typically be part of such a report.

Some codebook design issues for LTE-Advanced are considered in the following 3GPP documents:

| | |
|---|---|
| [1]: R1-100083 | Precoding Codebooks for 8TX, (Marvell); |
| [2]: R1-100051 | A Flexible Feedback Concept, (Ericsson, ST-Ericsson); |
| [3]: R1-100022 | Codebook design for 8Tx DL MIMO, (CATT); |
| [4]: R1-100251 | Extensions to Rel-8 type CQI/PMI/RI feedback using double codebook structure, (Huawei); and |
| [5]: R1-100531 | DL Codebook Design for 8 Tx MIMO in LTE-A, (ZTE) |

In LTE Release 8 a codebook is defined for the case of 4 antennas at the transmitter.

A modification of the method in [5] needs to be proposed to render the amended method more general and able to overcome the following problems:—
  The new method has more design flexibility in selection of vectors (pairs of columns from a set of 4×4 matrices, rather than an 8×8 matrix) in order to optimise codebook design (e.g. for system performance)
    An additional parameter (specifying a phase rotation) can generate more vectors than are available using the method in [5]. The method of [5] effectively allows phase rotations of $\{1,-1\}$. We propose $\{1, j, -1, -j\}$.
  The new method does not need additional 2×2 matrices (e.g. five such are required in the example given in [5])
  The new codebook coefficients can easily be constrained to an 8PSK alphabet (by limiting the constellation of the phase parameter)
  The new design is more easily configurable to support different codebook sizes for different transmission ranks

SUMMARY OF THE INVENTION

An object of the invention is to propose a method for generating a codebook which alleviate the above mentioned problems.

In accordance with a first aspect of the invention, it is proposed a method for operating a primary station comprising using a precoding codebook matrix/vector of length 2L being generated by the selection of two matrices/vectors, each from one of a predetermined set of L×L matrices and multiplying each column of one of the matrices/vectors by a complex coefficient.

In accordance with a second aspect of the invention, it is proposed a method for operating a primary station comprising using a precoding matrix/vector of length 2L being defined by an index and a transmission rank which together specify the two codebook matrices/vectors of length L of which it is composed, and the complex coefficients applied to the columns of one of the matrices/vectors.

In accordance with a third aspect of the invention, it is proposed a primary station comprising means for generating a precoding codebook matrix/vector of length 2L being generated by the selection of two matrices/vectors, each from one of a predetermined set of L×L matrices and multiplying each column of one of the matrices/vectors by a complex coefficient.

In a system of the invention, a primary station may comprise means for carrying out MIMO transmissions to at least one secondary station. Such MIMO transmissions usually involve precoding to achieve the highest possible data rate.

In accordance with other aspects of the invention, it is proposed a method for signalling a channel transfer function, wherein a terminal selects from a set of codebook matrices with dimensions between M×1 and M×M, wherein the number of matrices of a given dimension depends on the smaller of the matrix dimensions.

In a particular embodiment of this aspect of the invention, the number of entries is larger for a smaller dimension.

BRIEF DESCRIPTION OF THE DRAWING

The present invention will now be described in more detail, by way of example, with reference to the accompanying drawing, wherein.

DETAILED DESCRIPTION

Release 8 Codebook

Figure 1:
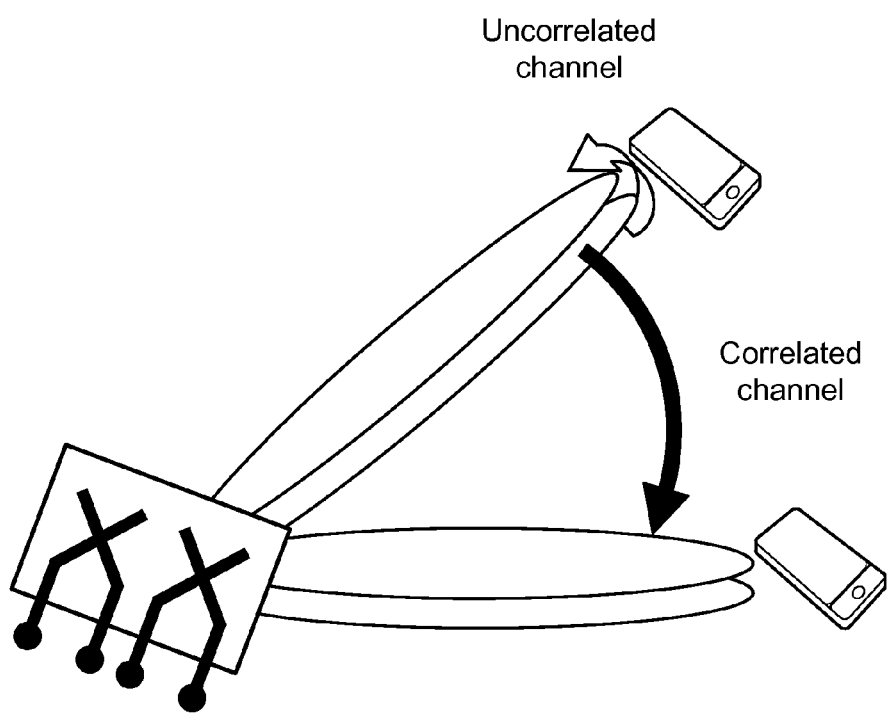
FIG. 1 is diagram representing schematically a system in which an embodiment of the invention is implemented.
Figure 2:
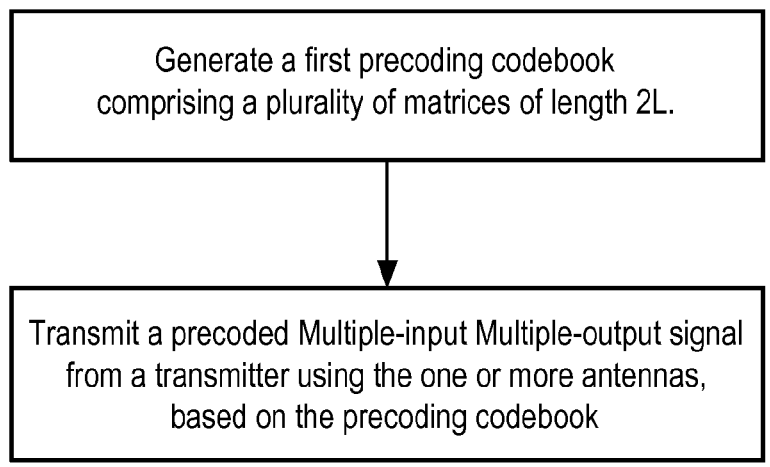
FIG. 2 is a diagram representing a method of an embodiment of the invention.

For reference we repeat the Release 8 codebook specification for 4 antennas:—

For transmission on four antenna ports, $p \in \{0, 1, 2, 3\}$, the precoding matrix W shall be selected from Table 6.3.4.2.3-2 or a subset thereof. The quantity $W_n^{\{s\}}$ denotes the matrix defined by the columns given by the set $\{s\}$ from the expression $W_n = I - 2u_n u_n^H / u_n^H u_n$ where I is the 4×4 identity matrix and the vector $u_n$ is given by the following Table 1.

TABLE 1

Codebook for transmission on antenna ports {0, 1, 2, 3}.

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In accordance with an exemplary embodiment of the invention, and using the same notation as above, a new codebook for 8 antennas can be defined in the form:—

$$Wnew_m^\upsilon = G_\upsilon \begin{bmatrix} W_{n1}^{\{s1\}} \\ \phi_m^{\{s2\}} W_{n2}^{\{s2\}} \end{bmatrix}$$

Where $Wnew_m^\upsilon$ is the new codebook entry for codebook index m and number of layers v, derived from two sets of coefficients from the Release 8 codebook defined by indices n1 and n2 and sets of columns {s1} and {s2} respectively. $G_\upsilon$ is a suitable scaling factor and $\phi_m$ is a phase factor, which could be different per column. In contrast to UMTS Release 8, the sets {s1} and {s2} can contain the same column more than once (but differing by the phase factor). This is necessary for transmission ranks greater than 4.

Particularly for lower transmission ranks it may be that {s1}={s2} is the best choice, but this is not necessarily the case and is certainly not a requirement.

For rank 1 with a ULA transmission at least some entries in the new codebook should match those from a DFT-based codebook. We note that the process of generating a DFT (Discrete Fourier Transform) based codebook entry for 8 antennas, starting with the Release 8 codebook entries for 4 antennas and extending the length of the vectors is equivalent to copying coefficients in Wn from rows 1 to 4 into rows 5 to 8. Some sets of coefficients need to be negated to maintain the DFT properties. This would also be supported by a codebook structure like $$\begin{bmatrix} A \\ \phi A \end{bmatrix},$$

where the phase value could be different per row.

This can typically be achieved if $W_{n1}^{(s1)}$ corresponds to DFT based codebook entry, with n1=n2 and {s1}={s2}, and with a suitable choice of $\phi_m \in \{1,-1\}$.

For rank 1 transmission with a cross polar array at least some entries should be chosen such that $W_{n1}^{(s1)} = W_{n2}^{(s2)}$, so that the same beam pattern can be transmitted on each polarisation. Again in this case it is convenient if n1=n2 and {s1}={s2}. A phase difference can be applied between the polarizations if for example $\phi_m \in \{1, j, -1, -j\}$.

Also for rank 2 transmission with a cross polar array at least some entries should be chosen such that $W_{n1}^{(s1)} = W_{n2}^{(s2)}$, that the same beam pattern can be transmitted on each polarisation. Again in this case it is convenient if n1=n2 and {s1}={s2}. To map each spatial stream to a different polarisation requires that the corresponding codebook entries have coefficients which are zero for antennas on one of the polarisations. This can be achieved with a further generalization to include more columns, taking the form:

$$Wnew_m^\upsilon = G_{\upsilon,m} \begin{bmatrix} W_{n1}^{\{s1\}} & W_{n3}^{\{s3\}} & 0 \\ \phi_m^{\{s2\}} W_{n2}^{\{s2\}} & 0 & W_{n3}^{\{s3\}} \end{bmatrix}$$

Here we explicitly indicate that the new columns contain the same vectors for both polarisations (so the same beam patterns are possible). Also the gain factor G may now depend on which columns are selected.

If even more flexibility is required further generalisations are possible. For example, with additional gain factors:—

$$Wnew_m^\upsilon = G_{\upsilon,m} \begin{bmatrix} W_{n1}^{\{s1\}} & \alpha W_{n3}^{\{s3\}} & \beta W_{n4}^{\{s4\}} \\ \phi_m^{\{s2\}} W_{n2}^{\{s2\}} & \gamma W_{n5}^{\{s5\}} & \delta W_{n6}^{\{s6\}} \end{bmatrix}$$

By choosing appropriate gain factors, for cross polar arrays, this would allow the generation of beams with different polarisation orientations, as might be required to match the physical orientation of cross polar receiving antennas. For example, if n3=n5 and {s3}={s5}, then $\alpha=1$, $\gamma=1$ would generate one beam, and $\alpha=1$, $\gamma=-1$ would generate a second beam with a polarization at right angles. Intermediate case could be used, such as $\alpha=1.5$, $\gamma=0.5$, $\alpha=1.5$, $\gamma=-0.5$. If the antenna array uses linear polarization, circular polarization could be generated by $\alpha=1$, $\gamma=j$. Similar effects could be achieved by choice of $\phi_m$ but with less flexibility.

Further Extensions

As extensions to the principles used in Release 8, we can consider the following possibilities:

For a given transmission rank more than one set of columns could be used with the same value(s) of n1 and n2, to generate entries for more than one codebook index.

Not all codebook indices may be applicable to every transmission rank. Entries designed for independent transmission of spatial streams on different polarisations may not be applicable for rank 1 or very high rank cases.

The effective size of the codebook does not have to be the same for all values of transmission rank (e.g. it would be possible to have a larger codebook size for lower transmission ranks). The example shown in the table below would require 8 bits to signal the codebook index and transmission rank (one less bit than the case of a fixed size of 6 bits for the codebook index and 3 bits for the rank).

| Codebook index | Number of layers supported |
| --- | --- |
| 0 | 1 to 8 |
| 1 | 1 to 8 |
| . | 1 to 8 |
| 14 | 1 to 8 |
| 15 | 1 to 8 |
| 16 | 1 to 4 |
| 17 | 1 to 4 |
| . | 1 to 4 |
| 30 | 1 to 4 |
| 31 | 1 to 4 |
| 32 | 1 to 2 |
| 33 | 1 to 2 |
| . | 1 to 2 |
| 46 | 1 to 2 |
| 47 | 1 to 2 |
| 48 | 1 to 2 |
| 49 | 1 to 2 |
| . | 1 to 2 |
| 62 | 1 to 2 |
| 63 | 1 to 2 |

FURTHER EMBODIMENTS

A further embodiment of the invention is in a system like LTE supporting MIMO transmission. The UE provides spatial feedback to the eNB that can be understood as indicating a precoder that can be used by the eNB in transmitting to the UE. This is equivalent to the UE selecting a precoder from a codebook of possible precoders. For a given number of antennas (e.g. 8), the specified codebook is designed with predetermined size (e.g. 4 bits). The UE may also feed back the preferred transmission rank (number of spatial streams), using e.g. 3 bits.

The codebook may include entries optimized for particular antenna configurations (e.g. 8 element uniform linear array or 4 element cross polar array with two cross polar ports per element).

As described above, the method for defining the codebook entries making up the codebook is based on use of an existing codebook using a form such as:

$$Wnew_m^v = G_{v,m} \begin{bmatrix} W_{n1}^{\{s1\}} & W_{n3}^{\{s3\}} & 0 \\ \phi_m^{\{s2\}} W_{n2}^{\{s2\}} & 0 & W_{n3}^{\{s3\}} \end{bmatrix}$$

In a variation of the embodiment the codebook size (i.e. number of applicable codebook entries) depends on the transmission rank.

In a further variation, for a given transmission rank more than one set of columns could be used with the same value(s) of n1 and n2, to generate entries for more than one codebook index.

In another embodiment based on LTE, a codebook for 8 transmit antennas is constructed based on the following Kronecker product structure:

$$M_{m,n} = K_m \otimes W_n$$

Where:
  $W_n$ is a 4×4 matrix from the release 8 codebook
  $K_m$ is a one of a set of 2×k matrices
    k is an integer (preferably greater than 1)
    the contents of $K_m$ are predetermined
      depending on the details of the embodiment, the contents of $K_m$ may depend on one or more of:—
        m
        Transmission rank (number of layers)

In the design of the codebook columns are selected from $M_{m,n}$ for codebooks for different transmission ranks/numbers of layers (i.e. equivalent to codebook $Wnew_m^v$ as described above). For 8 Tx antennas the up to 8 layers could be supported.

The channel state feedback from the terminal to the base station comprises at least transmission rank and the indices m and n. Depending on the details of the embodiment, the update rates for m and n may be different or signalled by different methods. In a preferred embodiment m is transmitted using PUCCH and n is transmitted using PUSCH. In a preferred embodiment, m is updated more frequently than n.

For LTE-A there is no UE channel state feedback defined for the case of 8 transmit antennas at the eNB. This document considers how the feedback for Release 8 could be extended to support MIMO transmission in this case.

Discussion

Although antenna configurations at the eNB will not be standardized, some practical configurations have been identified, which are most likely to be deployed in the cells of real systems. The two main options for the 8 antenna case considered here are:
  8 element uniform linear array
  4 element cross-polar array (with co-located pairs of horizontal and vertical antennas, giving 8 ports in total)

The UE can be assumed to have 2, 4 or 8 receive antennas, but at least initially, 2 antennas (or possibly 4) is the most likely configuration. The UE antennas may be designed to provide orthogonal polarizations.

We assume here that in highly scattering propagation environments, SU-MIMO is likely to be most appropriate transmission scheme, with transmission of up to 8 spatial streams, but only for those UEs with appropriate capabilities.

In environments with less scattering (i.e. approaching line of sight propagation), then MU-MIMO operation is more likely to be beneficial, and the total number of spatial streams will typically be limited by other factors than UE capabilities. It has been agreed in RAN1 that the UE spatial feedback can be understood as indicating a precoder that can be used by the eNB. This is equivalent to the UE selecting a precoder from a codebook of possible precoders. This document considers in more detail the requirements for such a codebook, with the main emphasis on MU-MIMO operation, and with the antennas configurations mentioned above.

MU-MIMO Operation with 8 Element Uniform Linear Array

As hinted in [1] we note that that a DFT based codebook design is well suited to MU-MIMO operation with Rank 1 transmission. Selecting one of these codebook entries by the UE for feedback to the eNB is equivalent to signal the azimuth angle of the UE location with respect to the eNB antenna array (assuming near line-of-sight propagation). This allows the eNB to form a beam in the direction of the UE. This aspect is well supported in the Release 8 codebook for 4 antennas, which contains 8 entries equivalent to those from a DFT based codebook, and applicable for Rank 1 transmission. This provides an angular resolution of pi/8 radians.

In order to support rank 1 MU-MIMO with 8 antennas at least as well as is done for 4 antennas, it would be desirable that Release 10 provides a Rank 1 codebook with at least 8 entries matching those of a DFT codebook, and with an angular resolution at least as fine as pi/8 radians.

To allow better performance than for Release 8, providing 16 DFT based codebook entries with an angular resolution of pi/16 could be considered. However, at this stage it is not clear whether this would be beneficial.

MU-MIMO Operation with 4 Element Cross-polar Array

In [2] it was noted that the channel coefficients with a cross polar array are likely to be highly correlated between the two polarizations (except for a phase factor), and the same beam pattern may be appropriate for both polarizations. For line-of-sight conditions this is physically reasonable provided the cross-polar elements are co-located.

FIG. 1: From [1] Showing the Case of High Correlation Between Two Beam Patterns to the Same UE on Different Polarisations Therefore, the 4 element (8 port) cross-polar array can be viewed as providing two instances of a 4 element linear array (distinguished by orthogonal polarizations). Furthermore, an important case which should be supported in Release 10 is where the same precoding weights would be applied on both polarization, with a possible phase difference, similar to proposals in [3,4].

Therefore, assuming the same precoding would be applied to both polarizations, we now consider two low rank cases, depending on the UE antenna properties:

(a) The UE cannot distinguish signals received with orthogonal polarizations. In this case rank 1 MU-MIMO operation can be supported if the eNB transmits one copy of the spatial stream on each polarization. This would be achieved with a codebook having a structure:

$$\begin{bmatrix} A \\ \phi A \end{bmatrix}$$

where A represents one of the set of precoding vectors/matrices which can be applied to one polarization and $\phi$ is one of a set of phase differences. The phase difference is needed to avoid the possibility of destructive interference between the two polarizations. Typically the UE should include this phase difference in its feedback.

(b) The UE can distinguish signals received with orthogonal polarizations. In this case rank 2 MU-MIMO operation can be supported if the eNB transmits two spatial streams with the same beams but orthogonal polarizations. Depending on the actual UE antenna orientation, this could be achieved, for example, by mapping one spatial stream to each antenna polarization, using a codebook structure such as $$\begin{bmatrix} A & 0 \\ 0 & \phi A \end{bmatrix}.$$

So for this case it may not be necessary for the UE to feed back the phase difference between the two polarizations, even if the phase difference was not zero. However, in the more general case, other sets of orthogonal precoding weights could be required.

SU-MIMO Operation with 4 Element Cross-polar Array and 8 Element Linear Array

In order to support rank 8 transmission efficiently with a cross polar array, it is likely that the UE would need to also have cross polar antennas, in which case the channel coefficients may be correlated between polarizations (except for a phase difference). In this case a suitable approach for codebook design would be to require entries with the same beamforming coefficients on the two polarizations, but allowing a phase difference. In this case a structure such as $$\begin{bmatrix} A & A \\ \theta A & \phi A \end{bmatrix}$$

might be appropriate, where $\theta$, $\phi$ are both from a set of possible phase values.

When applied to an 8 element linear array (or other structure), the different phase rotations would allow a variety of orthogonal beam patterns to be generated.

General Proposal

Considering the above discussion, and the desirability of keeping the Release 8 codebook, and its properties as far as possible in Release 10, the proposal in [5] seems a good starting point. This re-uses vectors from the Release 8 codebook for 4 antennas to generate codebook entries for 8 antennas. This proposal is further discussed and refined in the Annex below. The resulting codebook structure would have the following properties:—

Shared structure with Release 8 4 antenna codebook
For a uniform linear array the codebook
  Contains entries matching a DFT based codebook suitable for MU-MIMO rank 1 transmission
For a cross-polar array the codebook
  Supports the same beam pattern for different polarisations
  Provides for a phase difference between the polarisations
  Provides orthogonal precoder weights for rank 2 transmissions across polarisations, and suitable for MU-MIMO
Compatible with both MU-MIMO and SU-MIMO
UE PMI feedback could comprise
  Rank 1 to 8 (3 bits)
  Codebook index (4 bits or more)

CONCLUSIONS

From the above discussion on codebook design for UE feedback to support DL MIMO with 8 antennas we conclude the following:—

For efficient MU-MIMO in Release 10 it is desirable to retain the DFT codebook properties that are present in half of the entries in the existing Release 8 codebook.
For efficient MU-MIMO with rank 1 with cross polar arrays, it is desirable to have a codebook structure explicitly supporting two polarizations
  This implies the need for codebook vectors which allow the same beam patterns on different polarizations, but with a possible phase difference between polarizations
For efficient rank 2 transmission with cross polar arrays, it is desirable to have a codebook structure explicitly supporting two polarizations This implies the need for codebook vectors which allow the same or similar beam patterns on different polarizations, but with a possible phase difference between polarizations Codebook entries mapping a spatial stream to a polarization are also desirable.

Re-use of the Release 8 codebook structure and design principles would be desirable in order to simplify implementation A method has been proposed for deriving a Release 10 codebook for 8 antennas from the Release 8 codebook for 4 antennas which meets the above requirements, and has the following properties:—
Compatible with both MU-MIMO and SU-MIMO
Shared structure with Release 8 4 antenna codebook
UE PMI feedback could conveniently comprise:—
  Rank 1 to 8 (3 bits)
  Codebook index (4 bits or more)

The proposed approach would not preclude further enhancements (e.g. improved feedback accuracy)

In codebook comparisons, there should be an agreed antenna indexing scheme, particularly for cross polar arrays, since different assumptions could have a significant impact on performance.

In the exemplary embodiments, the precoding codebook is generated in the base station. However, in variants of the invention, the mobile station or user equipment may generate as well the precoding codebook in accordance with the invention.

The invention has particular, but not exclusive, application to wireless communication systems that employ multiple modes of transmission between a primary and secondary station, most notably MIMO and MU-MIMO modes. Examples include cellular systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a primary station, the primary station comprising means for carrying out precoded MIMO transmissions to at least one secondary station, the method comprising:
generating a first precoding codebook comprising a plurality of matrices of length 2L with at least one entry of the form:

$$W_{new_m^v} = G_v \begin{bmatrix} W_{n1}^{\{s1\}} & \phi_3^{\{s3\}} W_{n3}^{\{s3\}} \\ \phi_2^{\{s2\}} W_{n2}^{\{s2\}} & \phi_4^{\{s4\}} W_{n4}^{\{s4\}} \end{bmatrix}$$

wherein $W_{new_m^v}$ is the precoding codebook entry for the first precoding codebook with index m and number of layers v, being derived from a selection of four entries from a second codebook comprising a plurality of L×L matrices, the selected entries for a given value m being denoted by $W_{n1}^{\{s1\}}$, $W_{n2}^{\{s2\}}$, $W_{n3}^{\{s3\}}$ and $W_{n4}^{\{s4\}}$ respectively and defined by indices n1, n2, n3 and n4 to matrices in the second codebook and respective sets of one or more columns $\{s1\}$, $\{s2\}$, $\{s3\}$ and $\{s4\}$ thereof, where $\phi_2^{\{s2\}}$, $\phi_3^{\{s3\}}$ and $\phi_4^{\{s4\}}$ are sets of one or more complex coefficients, which could be different per column and G, is a scaling factor.

2. The method of claim 1, wherein L=4.

3. The method of claim 1, wherein the complex coefficients are $\{0,1,-1,j,-j\}$.

4. The method of claim 1, wherein the first precoding codebook is used regardless of the number of secondary stations communicating with the primary station in a MIMO mode.

5. The method of claim 1, wherein $\{s1\}=\{s2\}$, and $\{s3\}=\{s4\}$.

6. The method of claim 5, wherein A is an element of a Discrete Fourier Transform based codebook.

7. The method of claim 5, wherein the set of phase differences consists of values $\phi_m \in \{1, j, -1, -j\}$.

8. The method of claim 1, wherein the effective size of the first codebook is not the same for all values of transmission rank.

9. A primary station comprising:
one or more antennas; and
a circuit configured to:
generate a first precoding codebook comprising a plurality of matrices of length 2L with at least one entry of the form:

$$W_{new_m^v} = G_v \begin{bmatrix} W_{n1}^{\{s1\}} & \phi_3^{\{s3\}} W_{n3}^{\{s3\}} \\ \phi_2^{\{s2\}} W_{n2}^{\{s2\}} & \phi_4^{\{s4\}} W_{n4}^{\{s4\}} \end{bmatrix}$$

wherein $W_{new_m^v}$ is the precoding codebook entry for the first precoding codebook with index m and number of layers v, being derived from a selection of four entries from a second codebook comprising a plurality of L×L matrices, the selected entries for a given value denoted by $W_{n1}^{\{s1\}}$, $W_{n2}^{\{s2\}}$, $W_{n3}^{\{s3\}}$ and $W_{n4}^{\{s4\}}$ respectively and defined by indices n1, n2, n3 and n4 to matrices in the second codebook and respective sets of one or more columns $\{s1\}$, $\{s2\}$, $\{s3\}$ and $\{s4\}$ thereof, where $\phi_2^{\{s2\}}$, $\phi_3^{\{s3\}}$ and $\phi_4^{\{s4\}}$ are sets of one or more complex coefficients, which could be different per column and $G_v$ is a scaling factor; and
transmit a precoded Multiple-Input Multiple-Output signal from a transmitter using the one or more antennas, based on the first precoding codebook.

10. The primary station of claim 9, wherein the complex coefficients are $\{0,1,-1,j,-j\}$.

11. A secondary station comprising:
one or more antennas; and
a circuit configured to:
generate a first precoding codebook comprising a plurality of matrices of length 2L with at least one entry of the form:

$$W_{new_m^v} = G_v \begin{bmatrix} W_{n1}^{\{s1\}} & \phi_3^{\{s3\}} W_{n3}^{\{s3\}} \\ \phi_2^{\{s2\}} W_{n2}^{\{s2\}} & \phi_4^{\{s4\}} W_{n4}^{\{s4\}} \end{bmatrix}$$

wherein $W_{new_m^v}$ is the precoding codebook entry for the first precoding codebook with index m and number of layers v, being derived from a selection of four entries from a second codebook comprising a plurality of L×L matrices, the selected entries for a given value denoted by $W_{n1}^{\{s1\}}$, $W_{n2}^{\{s2\}}$, $W_{n3}^{\{s3\}}$ and $W_{n4}^{\{s4\}}$ respectively and defined by indices n1, n2, n3 and n4 to matrices in the second codebook and respective sets of one or more columns {s1}, {s2}, {s3} and {s4} thereof, where $\phi_2^{\{s2\}}$, $\phi_3^{\{s3\}}$ and $\phi_4^{\{s4\}}$ are sets of one or more complex coefficients, which could be different per column and $G_v$ is a scaling factor; and receive a transmission based on the first precoding codebook from a primary station using the one or more antennas.

12. A secondary station according to claim 11, additionally comprising a circuit to transmit to a primary station an indication of an entry in the first precoding codebook that could be used by said primary station to transmit to the secondary station.

\* \* \* \* \*